(12) United States Patent
Poplawski et al.

(10) Patent No.: US 6,804,958 B1
(45) Date of Patent: Oct. 19, 2004

(54) HYDROSTATIC TRANSMISSION BYPASS LATCH

(75) Inventors: Herb M. Poplawski, Sullivan, IL (US); Raymond Hauser, Sullivan, IL (US); John D. Schreier, Fitchburg, WI (US); Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/658,818

(22) Filed: Sep. 8, 2003

Related U.S. Application Data

(60) Continuation of application No. 10/082,750, filed on Feb. 25, 2002, now Pat. No. 6,651,427, which is a division of application No. 09/637,304, filed on Aug. 11, 2000, now Pat. No. 6,374,604.

(51) Int. Cl.[7] .......................... F16D 31/02; F16H 39/16
(52) U.S. Cl. ........................................ 60/436; 60/494
(58) Field of Search ........................ 60/436, 468, 494

(56) References Cited

U.S. PATENT DOCUMENTS

| | | |
|---|---|---|
| 3,339,363 A | 9/1967 | Quayle |
| 3,360,993 A | 1/1968 | Swanson et al. |
| 3,517,790 A | 6/1970 | Damon |
| 3,593,522 A * | 7/1971 | Angert et al. ................ 60/404 |
| 4,095,424 A | 6/1978 | Laky |
| 4,962,675 A | 10/1990 | Aoi et al. |
| 5,052,511 A * | 10/1991 | Hunt ........................... 180/305 |
| 5,094,077 A | 3/1992 | Okada |
| 5,119,632 A | 6/1992 | Nishimura et al. |
| 5,201,692 A | 4/1993 | Johnson et al. |
| 5,394,699 A | 3/1995 | Matsufuji |
| 5,709,083 A | 1/1998 | Sorbel et al. |
| 5,771,758 A | 6/1998 | Hauser |
| 5,782,142 A | 7/1998 | Abend et al. |
| 5,782,717 A | 7/1998 | Smothers et al. |
| 5,836,159 A | 11/1998 | Shimizu et al. |
| 5,950,500 A | 9/1999 | Okada et al. |
| 5,957,229 A | 9/1999 | Ishii |
| 6,145,312 A | 11/2000 | Hauser et al. |

* cited by examiner

*Primary Examiner*—Edward K. Look
*Assistant Examiner*—Igor Kershteyn
(74) *Attorney, Agent, or Firm*—Neal, Gerber & Eisenberg, LLP

(57) ABSTRACT

A hydrostatic transmission may be placed in a free-wheeling state by rotating a bypass actuator that lifts the motor from a motor running surface whereby hydraulic fluid flows into a transmission cavity. A bypass arm connected to the bypass actuator and to a bypass rod may be used to engage and disengage the bypass actuator via operation of the rod. Further, a bypass latch may be used to lock the bypass arm in an engaged position whereby the bypass actuator is engaged and the transmission is disengaged. The bypass latch arm is preferably linked to the brake pedal whereby actuation of the brake pedal disengages the bypass actuator through operation of the latching arm. The system may be designed to provide dynamic braking through transmission resistivity prior to application of a brake force to the axles or wheels by unlatching the bypass arm prior to actuating the brake arm.

15 Claims, 19 Drawing Sheets

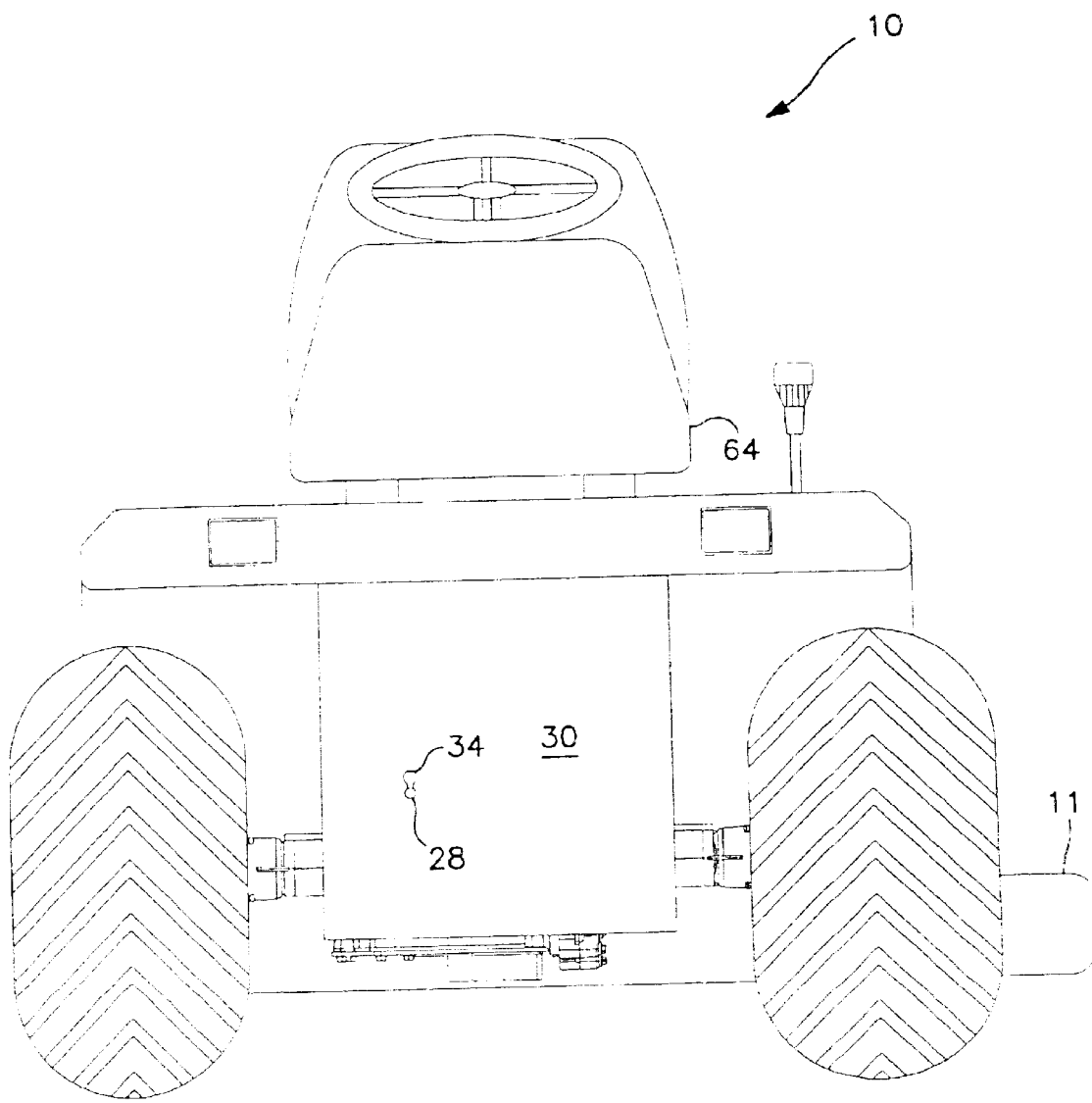

HYDROSTATIC TRANSMISSION BYPASS LATCH

CROSS-REFERENCE TO RELATED APPLICATIONS

This application is a continuation of U.S. patent application Ser. No. 10/082,750, filed Feb. 25, 2002 now U.S. Pat. No. 6,651,427, which is a division of U.S. patent application Ser. No. 09/637,304, filed Aug. 11, 2000, now U.S. Pat. No. 6,374,604 and, therefore, claims the earlier filing date under 35 U.S.C. 120. Both of these applications are incorporated herein by reference in their entirety.

FIELD OF THE INVENTION

The present invention relates generally to hydrostatic transmissions ("HST") and transaxles including hydrostatic transmissions, and in particular to a bypass system for such transmissions. Specific exemplary embodiments discussed herein relate to riding lawn mowers and similar small tractors.

BACKGROUND OF THE INVENTION

The description of art in this section is not intended to constitute an admission that any patent, publication or other information referred to herein is "prior art" with respect to this invention, unless specifically designated as such.

Riding lawn mowers and small tractors 10 of the type discussed herein and depicted in FIGS. 1A and 1B generally use an engine having a vertical output shaft 12 that is connected to the transaxle 14 via a conventional belt and pulley system 16. A standard HST for such a transaxle includes a hydraulic pump that is driven by the engine output shaft 12, and a hydraulic motor, both of which are usually mounted on a center section. Rotation of the pump by an input shaft creates an axial motion for the pump pistons. The oil pressure created by this axial motion is channeled via porting to the hydraulic motor, where it is received by the motor pistons. The axial motion of these pistons against a thrust bearing causes the motor to rotate. The hydraulic motor in turn has an output shaft that drives the vehicle axles through differential gearing. For additional background, the reader is referred to U.S. Pat. No. 5,201,692, ("the '692 patent") issued to Johnson et al., and incorporated herein by reference in its entirety.

A problem with the typical HST arrangement is that a "neutral gear" does not exist, as it is merely a point where the hydraulic pressure in the pump goes to zero.

However, at this point the oil remains in the transmission, preventing the vehicle from being freely rolled. The present invention is an improvement over prior art methods used to place a transaxle into neutral gear and enable movement of the tractor without the motor running or, more generally, without the transmission being engaged.

Prior art has solved the problem by diverting the oil through a hydraulic valve from the pressure side to the vacuum side of the HST center section. The problem with such a design is that the hydraulic valve allows for the movement of only a limited amount of oil due to inherent design limitations, such as the diameter of the hydraulic valve through which the oil is diverted. Machining such a valve also requires precise tolerances, thus increasing the manufacturing costs of the unit.

The '692 patent solves this neutral gear problem by providing a mechanism whereby the motor block is mechanically lifted from its running surface. This mechanism allows the oil to bypass the vacuum-pressure (hydraulic) circuit and to exit the case completely. This mechanism operates to enable the vehicle to free-wheel more easily than is possible with prior art hydraulic valve methods.

FIG. 1C (which is similar to FIG. 2 of the '692 patent) is a section view through the transaxle 14. To activate the bypass feature disclosed in the '692 patent, a bypass arm 18 is manipulated by the user to rotate a bypass actuator 20. The bypass actuator 20 includes a rod 22 which is shaped at its base 24 so that rotation of the rod 22 forces a bypass plate 26 to press against the base of the motor 29, thereby breaking its seal to the motor running surface (See FIGS. 2 and 5 of the '692 patent). It will be apparent to those of skill in the art that a pin or multiple pins, or other mechanical means may be used to lift the motor block. These mechanical lifting mechanisms allow the oil to flow between the motor and the transmission cavity.

A bypass rod 28 is connected to the bypass arm 18 to facilitate manipulation of the bypass arm 18. FIG. 1D shows the bypass rod 28 in an unlocked position. The prior art means for activating the bypass mechanism includes pulling the bypass rod 28 through the tractor hitch plate 30 and securing it in place with a weldment (or cross pin) 32. To secure the bypass rod 28 in the hitch plate 30, the hitch plate 30 must include a relatively complex stamp out, e.g., a keyhole 34. See FIG. 1F which shows the bypass rod 28 extending through the keyhole 34 of the hitch plate 30. Perhaps more troublesome is the requirement to have tight tolerances for setting the cross pin 32 relative to the hitch plate 30 and, the keyhole 34. This tolerance requirement is especially frustrating because manufacturing tolerances involving the hitch plate 30 and the vehicle frame are much looser.

While the present invention relates to hydrostatic transaxles and transmissions generally, it will be better understood within the discussion of exemplary embodiments directed toward riding lawnmowers and similar small tractors.

SUMMARY OF THE INVENTION

A primary object of the present invention is directed toward a bypass system, and in particular, a bypass latch, for a hydrostatic transaxle or transmission. A hydrostatic transaxle according to one embodiment of the present invention comprises a casing including a hydrostatic transmission located in the casing. The transmission comprises a motor on a motor running surface and a pump connected to the motor via a hydraulic circuit. A bypass actuator, in a preferred embodiment, is rotatably positioned to lift the motor from the motor running surface when the actuator is rotated such that hydraulic fluid flows out of the motor (a part of the hydraulic circuit). Alternatively, other components can be shifted to allow fluid to flow out of the hydraulic circuit. A bypass arm is preferably positioned external to the casing (though need not be) and affixed to the bypass actuator' and rotatable therewith. A latch arm that is rotatable about an axis parallel to an axis about which the bypass actuator rotates is adapted to releasably engage the bypass arm. The latch arm is coupled with a brake rod such that operation of the brake rod disengages the latch arm from the bypass arm, whereby the bypass actuator is disengaged and the transmission is thereby engaged.

Accordingly, an embodiment of the invention is directed toward a bypass 15 assembly comprising a latch arm having a latching end for releasably engaging the bypass arm and a brake end coupled with a brake rod. A returning spring, preferably an extension spring, is connected to the latch arm to apply a returning force to bias the latch arm toward an at-rest position. In a preferred embodiment the at-rest position is the position where the brake end of the latch arm abuts, or is stopped against, a brake arm. A second spring, preferably a compression spring, cooperating with the brake rod is used to apply a braking force to the brake arm when the brake rod is actuated. In a preferred embodiment, the compression spring transmits a force to the braking end of the latch arm prior to transmitting a braking force to the wheels or axles of the tractor. A slidable member adapted to control the timing of the force may be positioned on the brake rod.

One advantage of the design is that it is integral with the transmission. One method of integrating a bypass latch with a hydrostatic transmission according to the present invention comprises placing the hydrostatic transmission in a casing and connecting a bypass actuator to the transmission. This allows the transmission to roll more freely when the bypass actuator is engaged than when the bypass actuator is disengaged. A bypass arm positioned external to the casing is connected to operate the bypass actuator. A latch arm adapted to releasably engage the bypass arm is positioned external to the casing as well. The method of integrating further includes linking the latching arm to a brake rod such that operation of the brake rod causes the latching arm to release the bypass arm, whereby the bypass actuator is disengaged.

By integrating the design, the manufacturer could provide a means to actuate the bypass that is less expensive than the prior art. The current means of activation involves a bent wire form with a weldment (or cross pin). A straight wire form, rod, or stamping could be used with the proposed invention thereby reducing tolerance requirements and costs.

Another advantage of the invention is that it can be deactivated by the pressing of the brake pedal. Many vehicles require the operator to press the brake pedal prior to starting the tractor. The present invention, which deactivates the bypass actuator when the brake pedal is applied, insures that the transmission is ready for operation. This is particular useful when the user has perhaps forgotten that the bypass has been left "on," i.e. the transmission is disengaged.

Other objects and advantages in accordance with the present invention will be apparent to those of skill in the art from the teachings disclosed herein.

BRIEF DESCRIPTION OF THE DRAWINGS

In the interest of enabling one of skill in the art to practice the invention, exemplary embodiments are shown and described. For clarity, details apparent to those of skill in the art without undue experimentation are generally omitted from the drawings and description.

FIG. 1F shows the bypass rod of FIG. 1E extending through a keyhole stamp out in the tractor hitch plate.

FIG. 5 shows a rear view of a vehicle employing the present invention such that only a circular stamp out is needed in the hitch plate to allow the bypass rod to pass through.

DESCRIPTION OF EXEMPLARY EMBODIMENTS

Figure 1A:
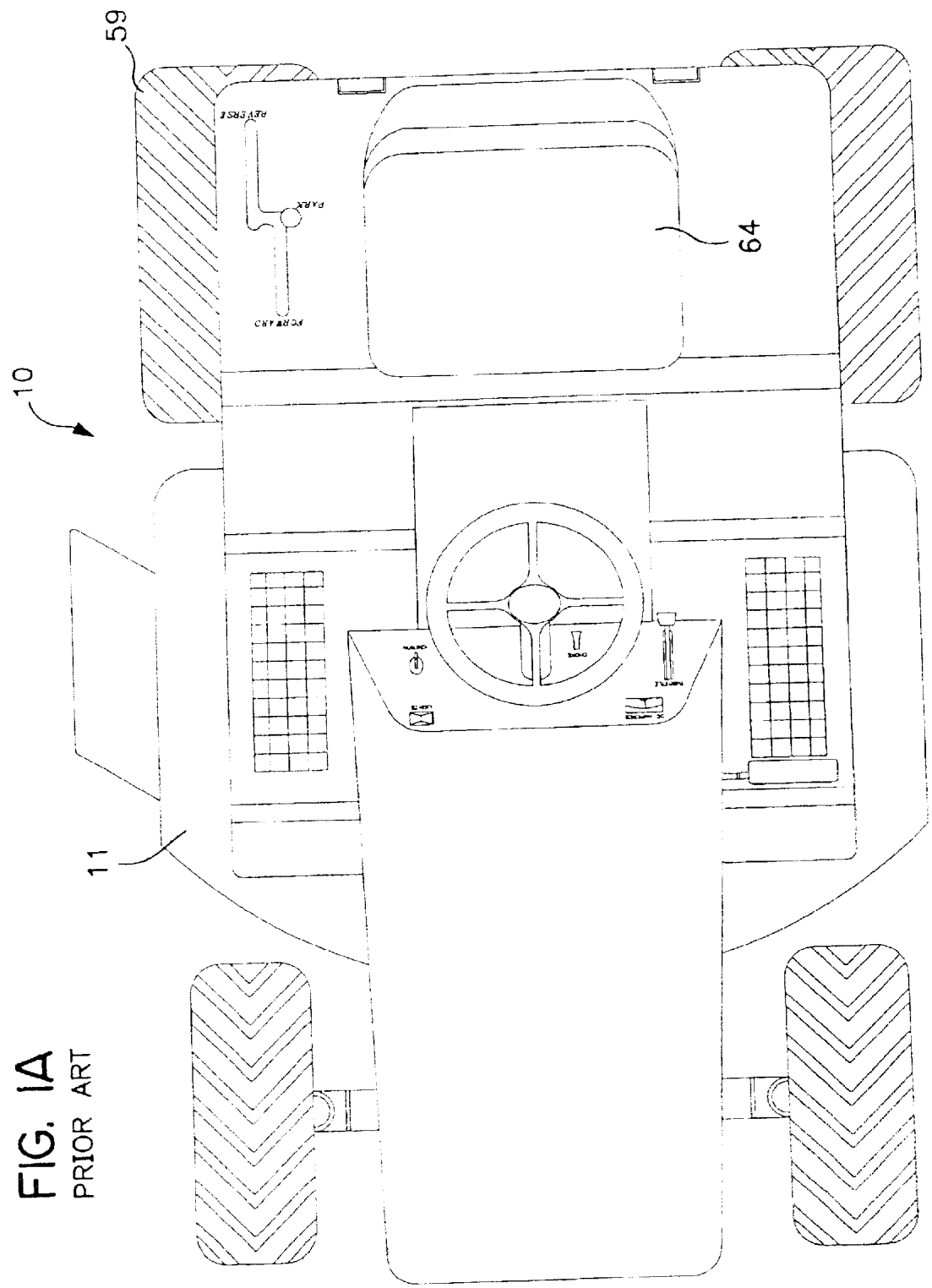
FIG. 1A depicts a plan view of a typical lawn tractor.
Figure 1B:
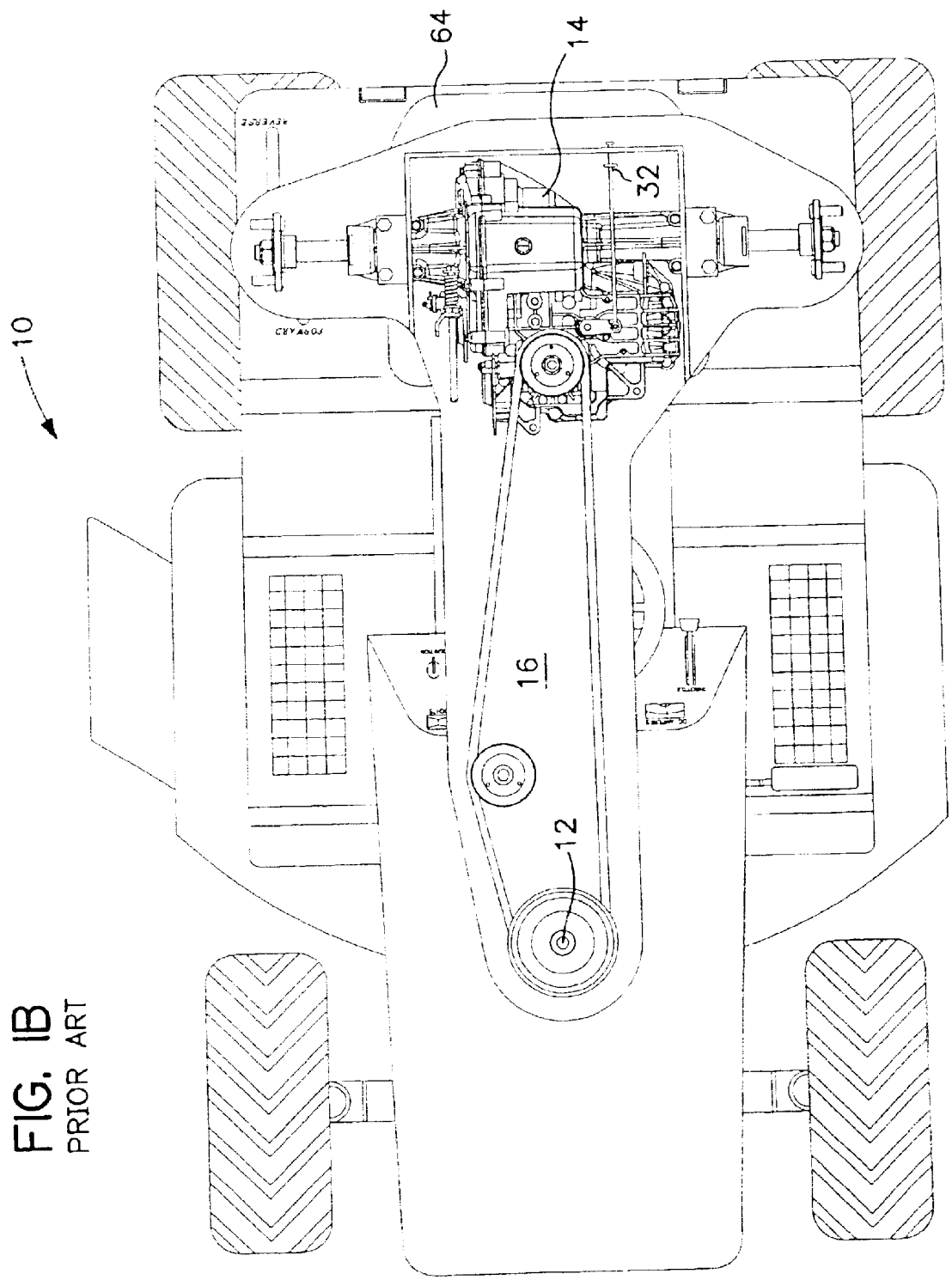
FIG. 1B shows a lawn tractor similar to that of FIG. 1A with a cutout to show a transaxle connected to an engine output via a belt system.
Figure 1C:
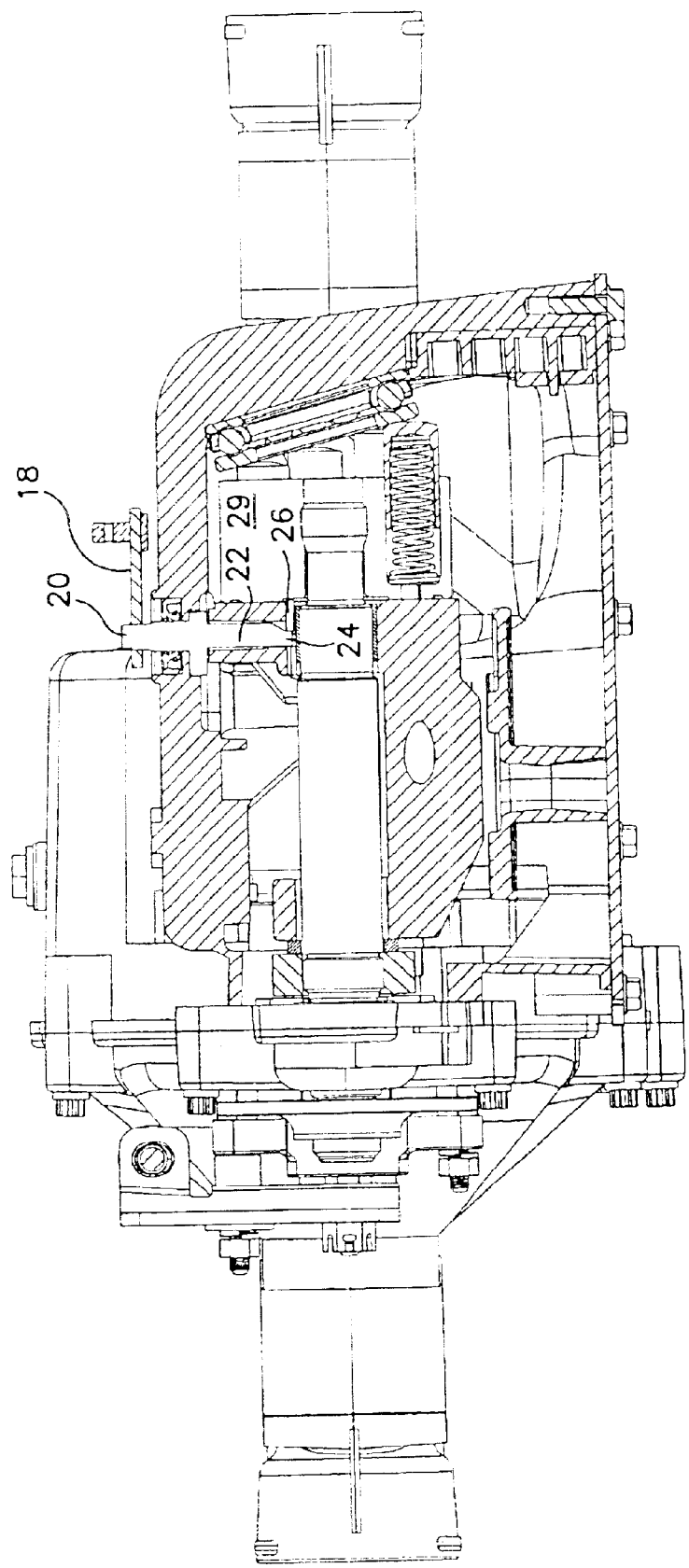
FIG. 1C is a section view through a prior art transaxle showing a bypass actuator.
Figure 1D:
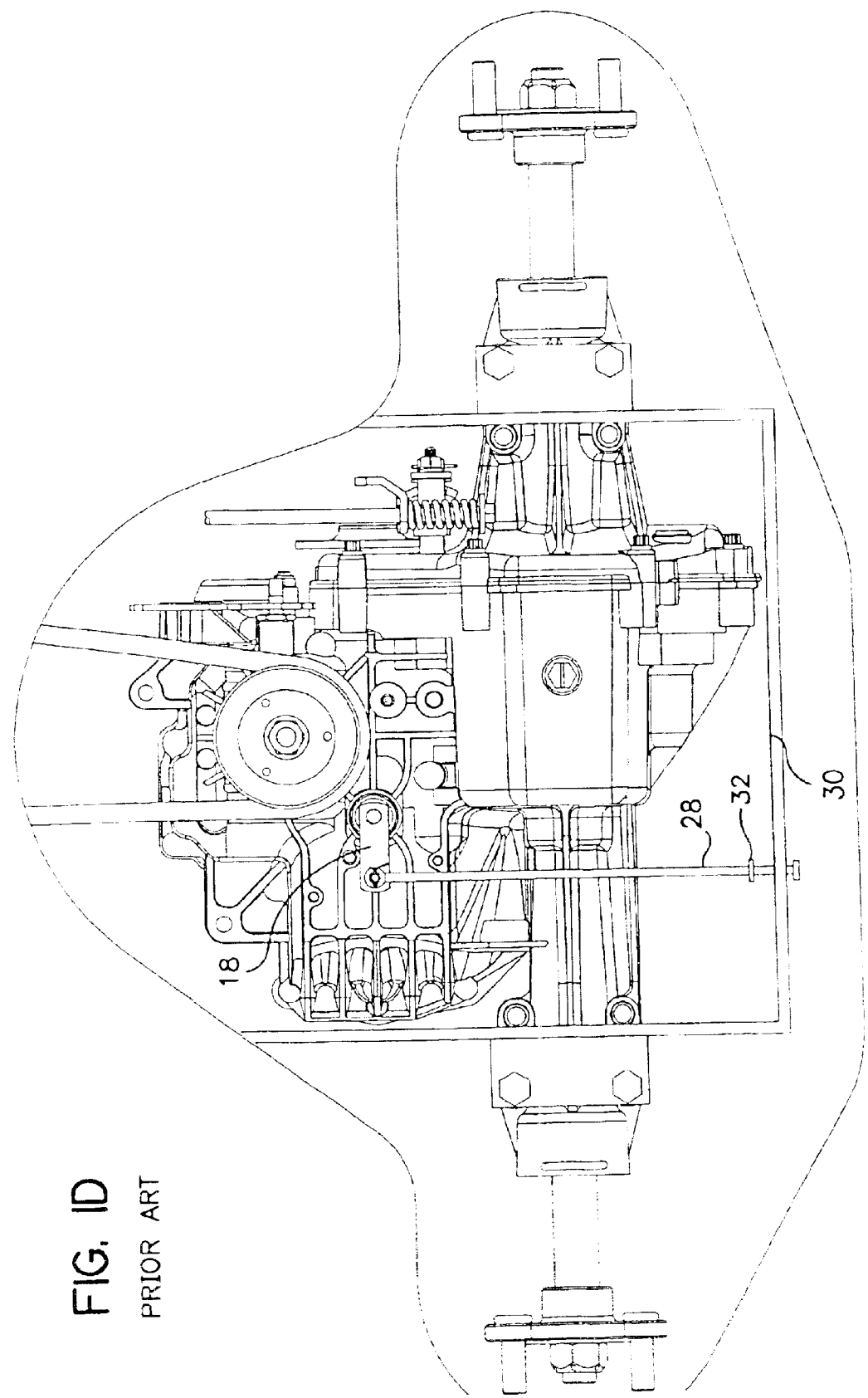
FIG. 1D is an enlarged view of FIG. 1B showing a prior art design for manipulating and locking a bypass arm.
Figure 1E:
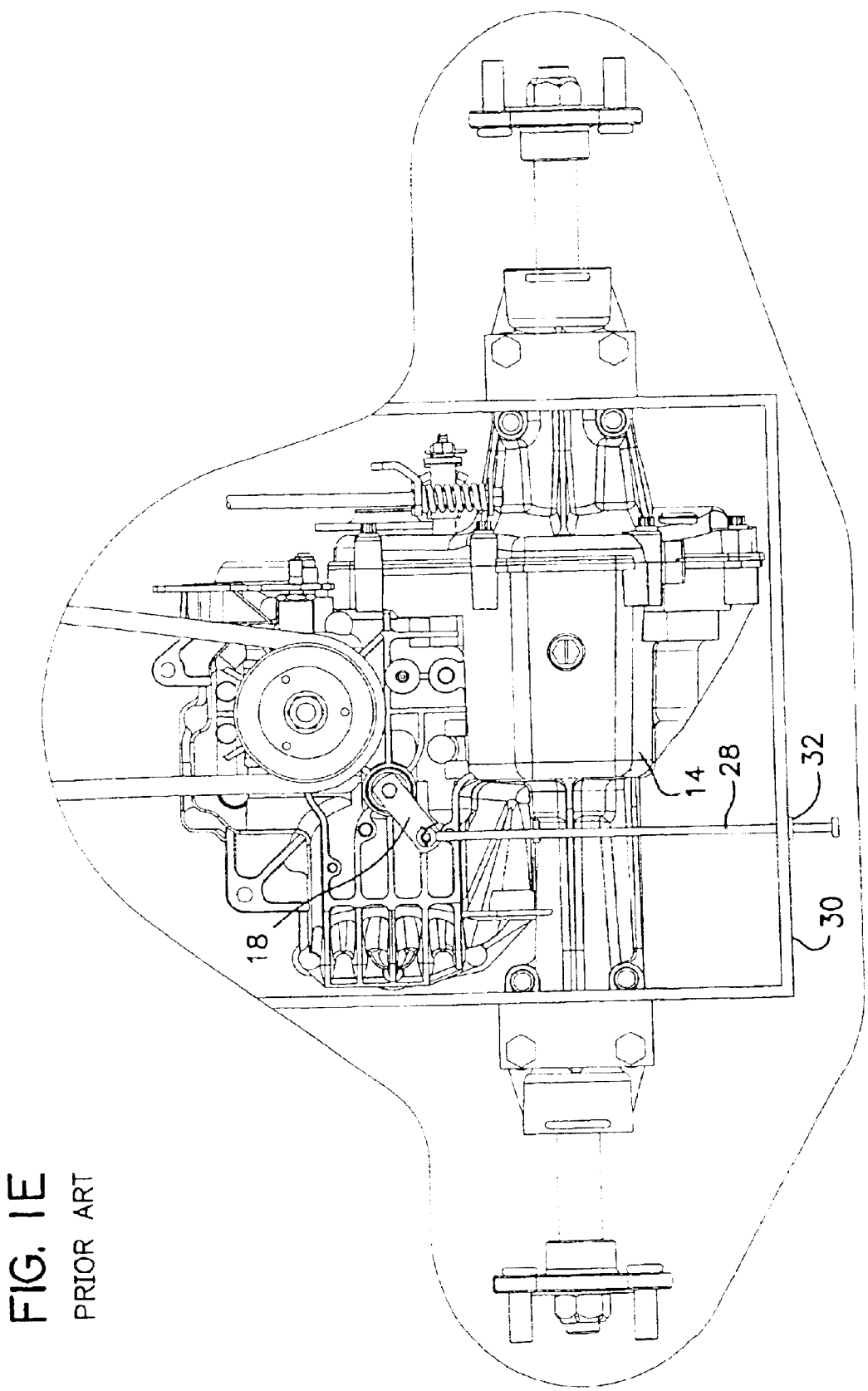
FIG. 1E shows the bypass arm of FIG. 1D secured in an engaged position via a cross pin on the bypass rod.

The present invention is discussed in relation to lawn tractors, however, other uses will be apparent from the teachings disclosed herein. The present invention will be better understood from the following detailed description of exemplary embodiments with reference to the attached drawings, wherein like reference numerals and characters refer to like parts, and by reference to the following claims.

Figure 2:
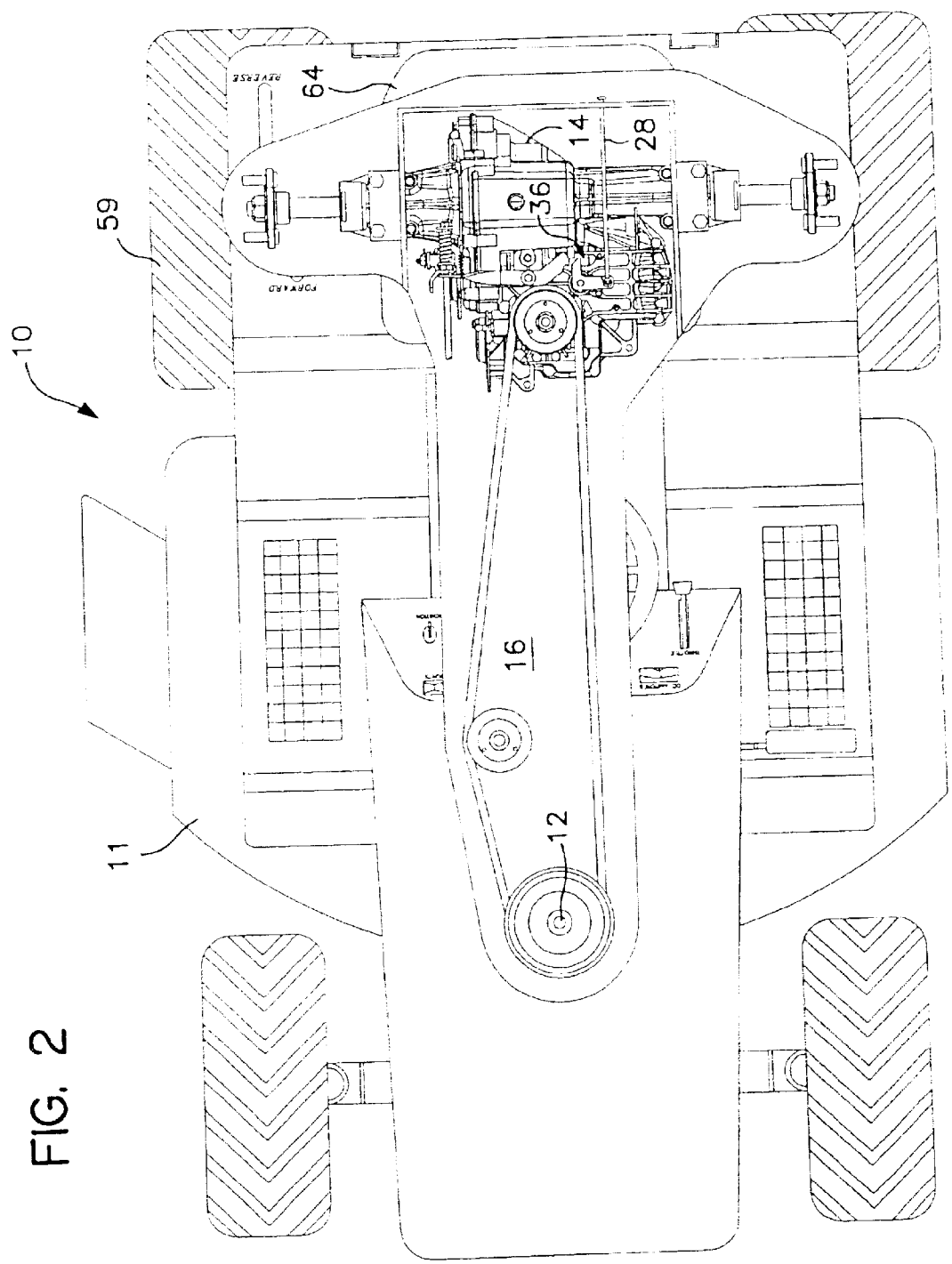
FIG. 2 shows a bypass latch according to one embodiment of the present invention.

FIG. 2 depicts a transaxle 14 with bypass latch 36 shown installed in the tractor 10. The bypass arm is shown in the "off" position or the disengaged position. Some vehicles may have the transaxle 14 (or more generally the transmission) rotated 180 degrees from what is shown in FIG. 2. If the transaxle is rotated, then the bypass rod 28 may extend forward, rather than rearward as shown. The bypass rod 28 may also be rotated relative to the transaxle 14 to provide access to the bypass actuator from another direction without changing the orientation of the transaxle 14. Thus, a design wherein the bypass rod 28 extends out the back of vehicle 10 is only one of many options for providing customer access. For example, in an embodiment wherein the bypass rod 28 extends to one of the sides, the attachment point of the bypass arm 18 need only be rotated 90 degrees to provide the desired coupling between the bypass actuator 20 and the bypass rod 28. Other mechanisms to attain the desired rotary motion will be apparent to those of skill in the art.

Figure 3:
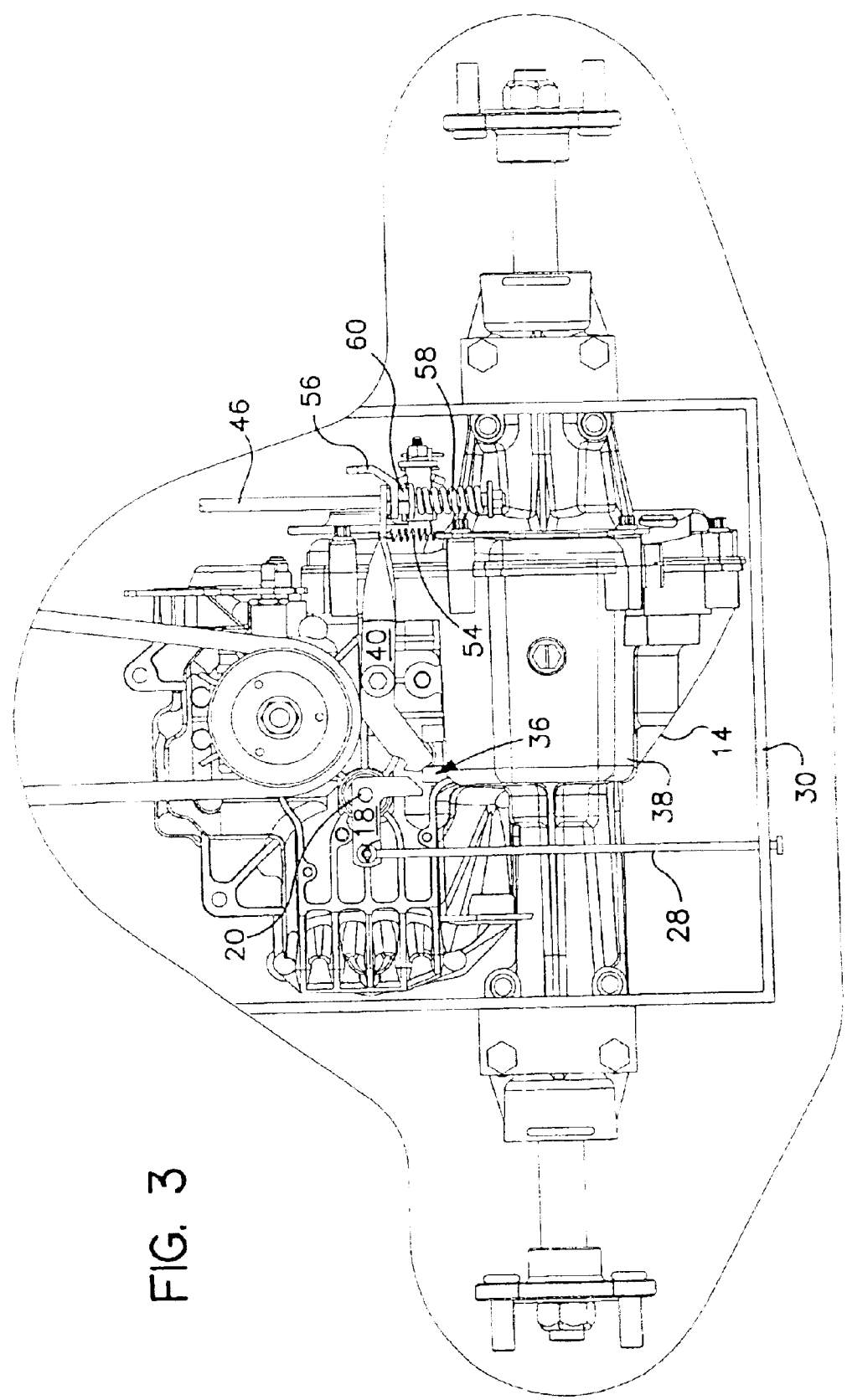
FIG. 3 depicts an enlarged view the transaxle of FIG. 2, showing the bypass arm disengaged i.e., transmission engaged.

FIG. 3 depicts an enlarged view of FIG. 2, showing a hydrostatic transaxle according to one embodiment of the present invention. The transaxle 14 comprises a casing 38 including a hydrostatic transmission located in the casing (the transmission is not shown in FIG. 3). Reference should be made to the '692 patent for additional detail regarding the general background of the invention. The transmission comprises a motor on a motor running surface and a pump connected to the motor via a hydraulic circuit. A bypass actuator 20 is rotatably positioned to lift a transmission component when the actuator 20 is rotated such that hydraulic fluid flows out of the hydraulic circuit. In a preferred embodiment the motor 29 is lifted from the motor running surface when the bypass actuator 20 is rotated. A bypass arm 18 is preferably positioned external to the casing 38 and affixed to the bypass actuator 20 and rotatable therewith. A latch arm 40, that is rotatable about an axis 42 (See FIG. 13) which is parallel to an axis 44 about which the bypass actuator 20 rotates, is adapted to releasably engage the bypass arm 18. The latch arm 40 is coupled with a brake rod 46 such that operation of the brake rod 46 disengages the latch arm 40 from the bypass arm 18, whereby the bypass actuator 20 is disengaged and the transmission is thereby engaged as the motor (or other transmission component) reseats itself.

Figure 13:
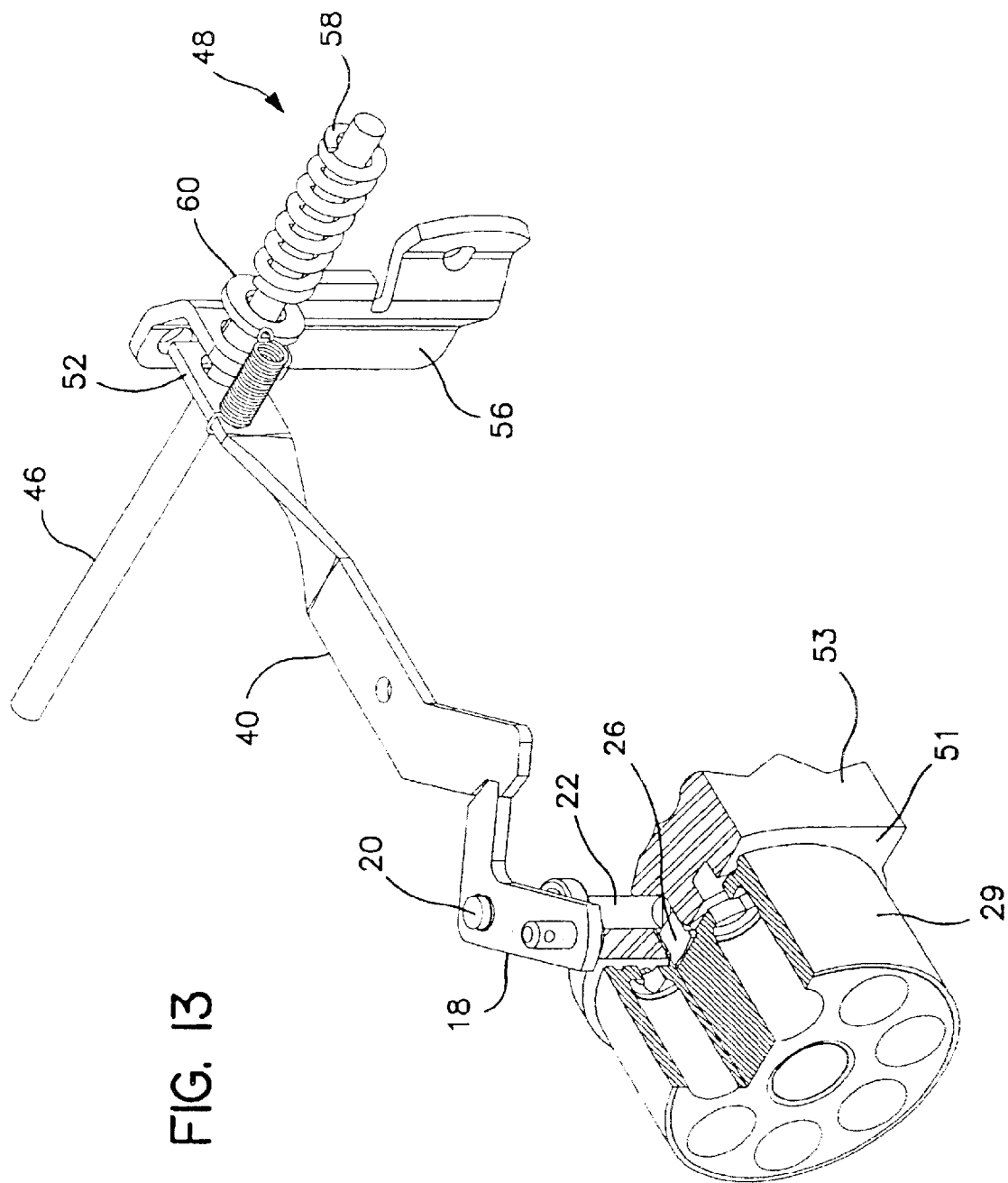
FIG. 13 is a perspective view of the bypass latch system according to the present invention, showing the bypass in the on position.

Accordingly, an embodiment of the invention is directed toward a bypass assembly 48 such as shown in FIG. 13. The assembly 48 comprises a latch arm 40 rotatable about an axis 42 parallel to an axis 44 about which the bypass arm 18 rotates. The latch arm 40 comprises a latching end 50 for releasably engaging the bypass arm 18 and a brake end 52 coupled with a brake rod 46. In a preferred embodiment, the brake end 52 is slidably coupled with the brake end 46, but other means for movably coupling the two will suffice. A return spring 54, preferably an extension spring, is connected to the latch arm 40 to apply a returning force to bias the latch arm 40 toward an at-rest position (See FIGS. 3 and 7). In a preferred embodiment, the at-rest position is the position where the brake end 52 of the latch arm 40 abuts, or is stopped against, a brake arm 56; intervening structure, such as spacers is acceptable. The brake end 52 need not directly rest against the brake arm 56. A compression spring 58 cooperating with the brake rod 46 is used to apply a braking force to the brake arm 56 when the brake rod 46 is actuated. In a preferred embodiment, the compression spring 58 transmits a force to the braking end 52 of the latch arm 40 (via a bushing 60 positioned on the brake rod 46) prior to the compression spring 58 transmitting a braking force, via the brake arm 56, to the wheels 59 or axles of the tractor 10.

More generally, the bushing 60 may be a slidable member adapted to apply the brake force (from the brake rod 46) to the latch arm 40 before the brake arm 56 is activated. Preferably the slidable member is positioned on the brake rod 46 between the compression spring 58 and the brake arm 56. In a preferred embodiment, the bushing 60 and the brake arm 56 are designed such that an end of the bushing will pass through an opening 62 in the brake arm 56, but an opposing end of the bushing 60 will not pass through the opening 62.

Figure 7:
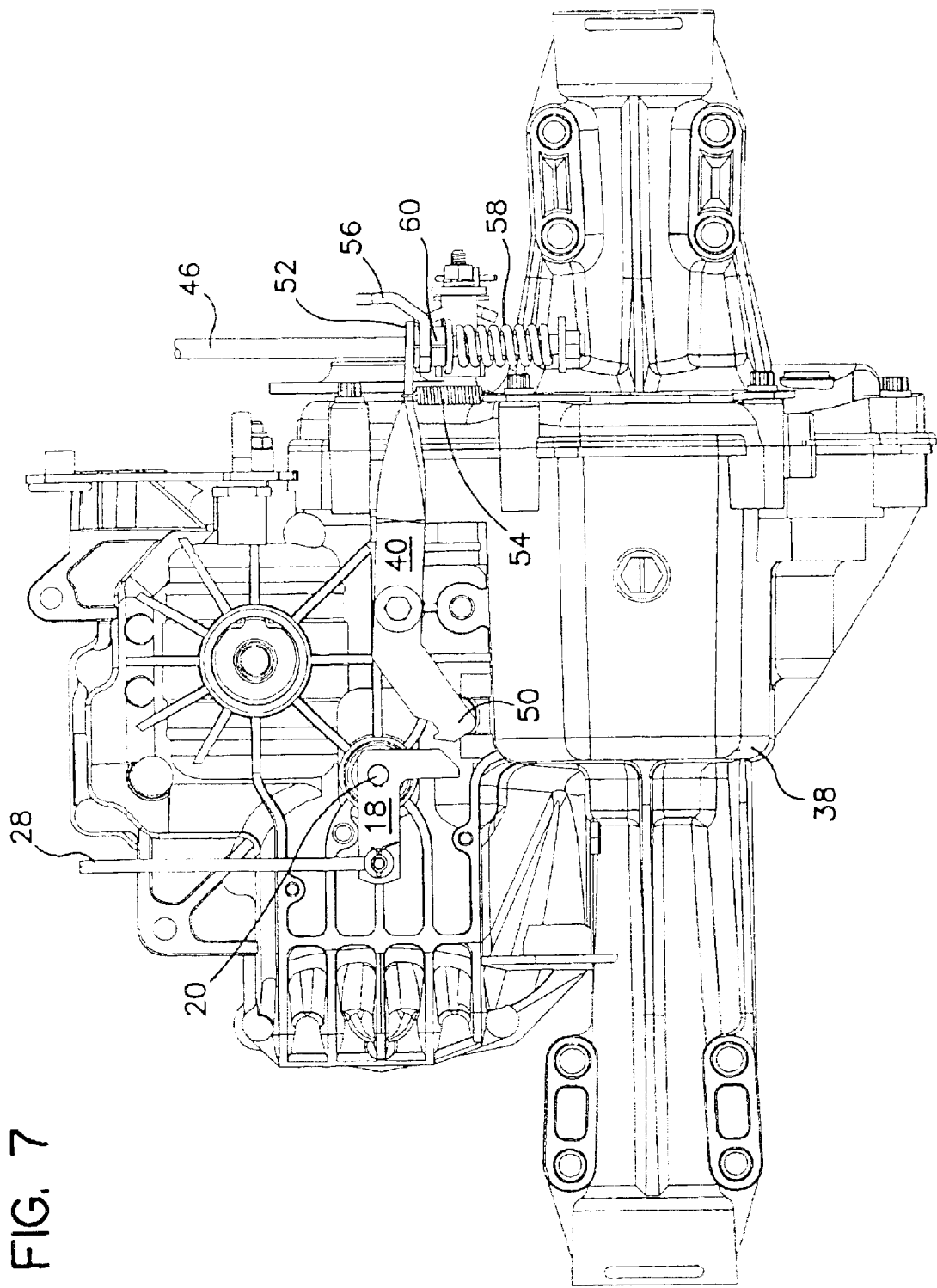
FIG. 7 shows a top view of a transmission similar to that show in FIG. 2, but with the bypass rod extending in the opposite direction.

In FIGS. 3 and 7, the latch arm 40 is positioned against the brake arm 56 and the spacer 60 (bushing) as well, i.e. the latch arm 40 is not directly against the brake arm 56. The bypass rod 28 is positioned rearward in FIG. 3 and forward in FIG. 7. The vehicle will not roll easily in this condition, where the transmission is engaged, without engine input because of back driving the gears, the pump, the pulleys, etc. To engage the bypass actuator 20, in the orientation shown in FIG. 3, the user pulls the bypass rod 28.

Figure 4:
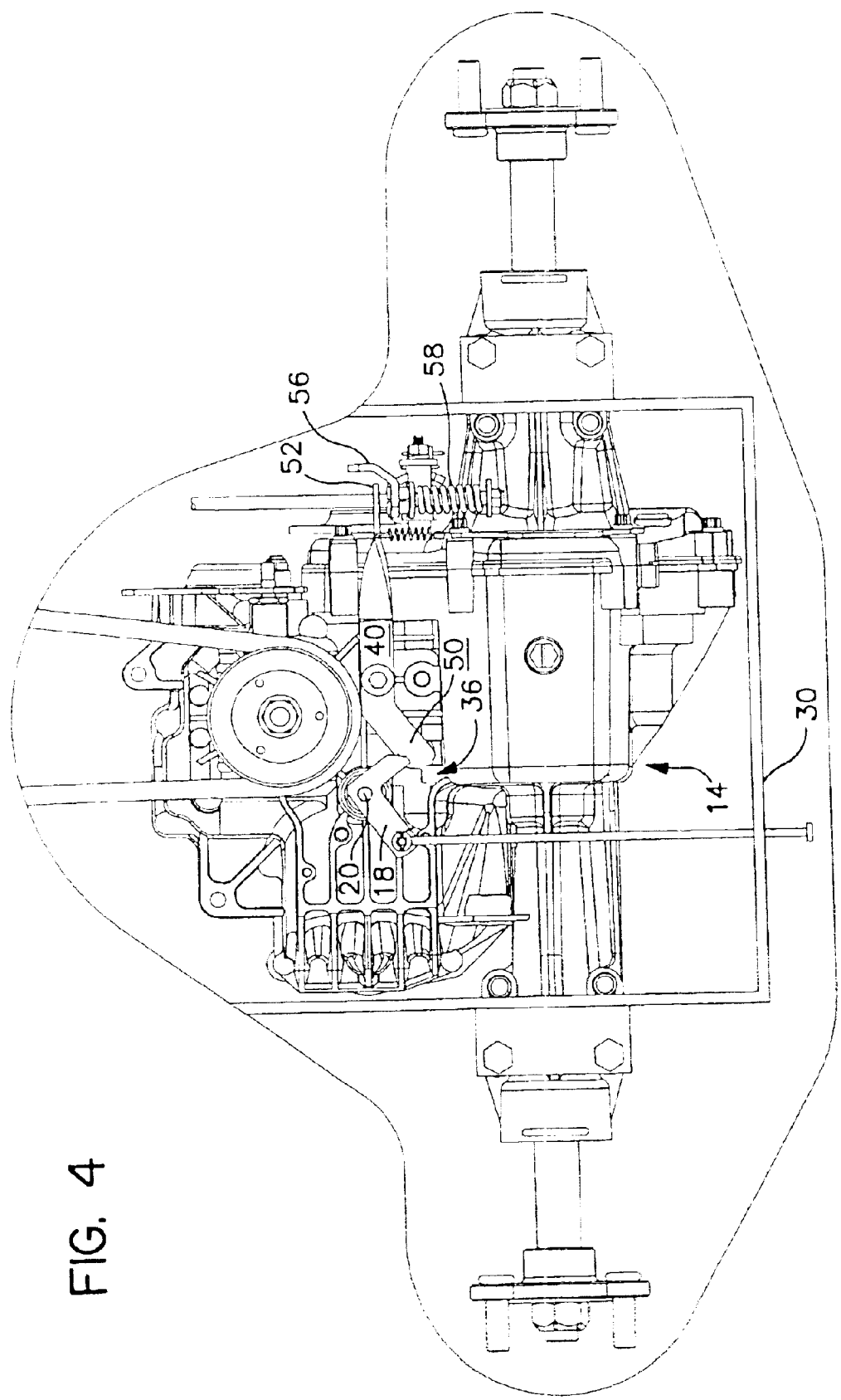
FIG. 4 is similar to FIG. 3 but with the bypass arm in the "on" or latched position.
Figure 5:
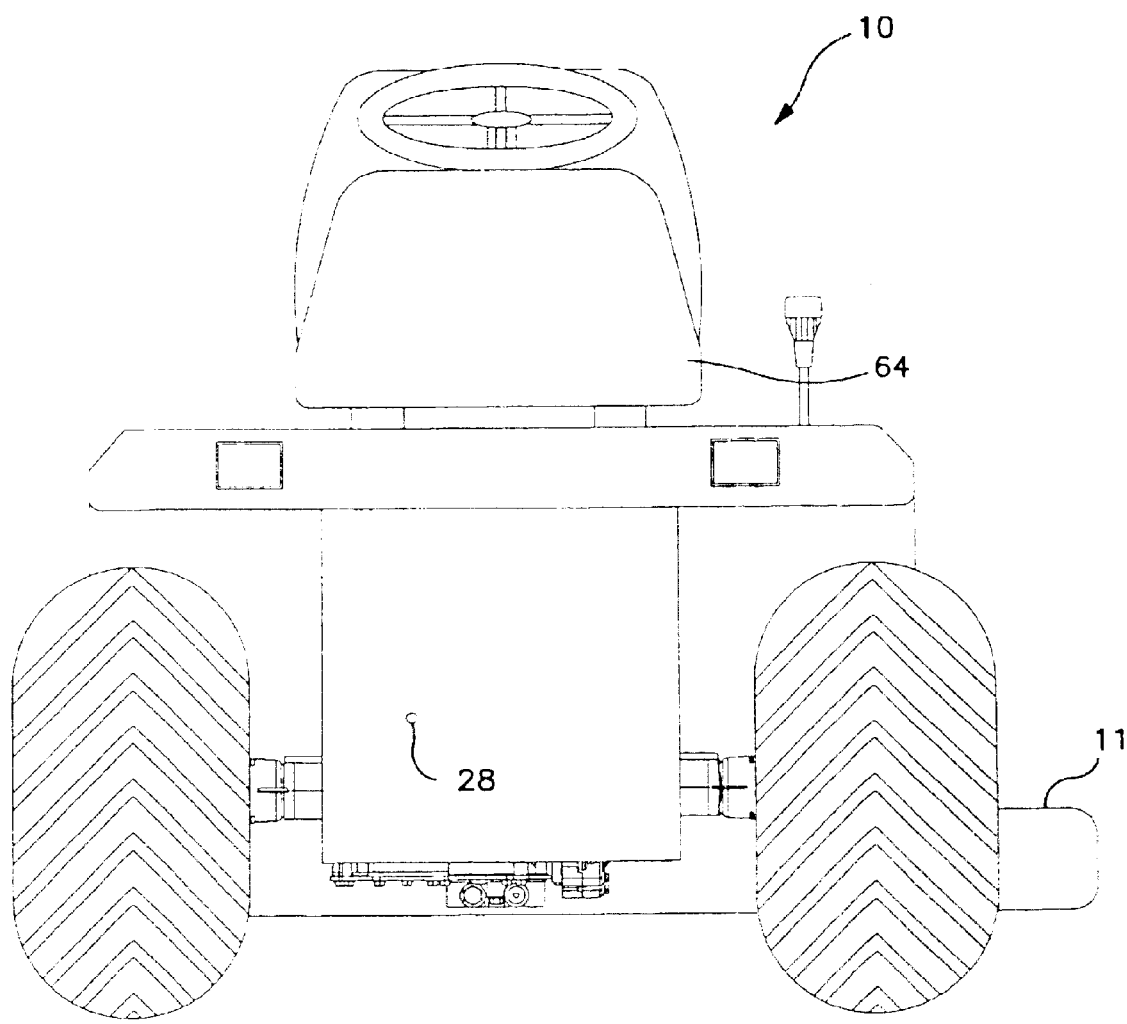
Figure 6:
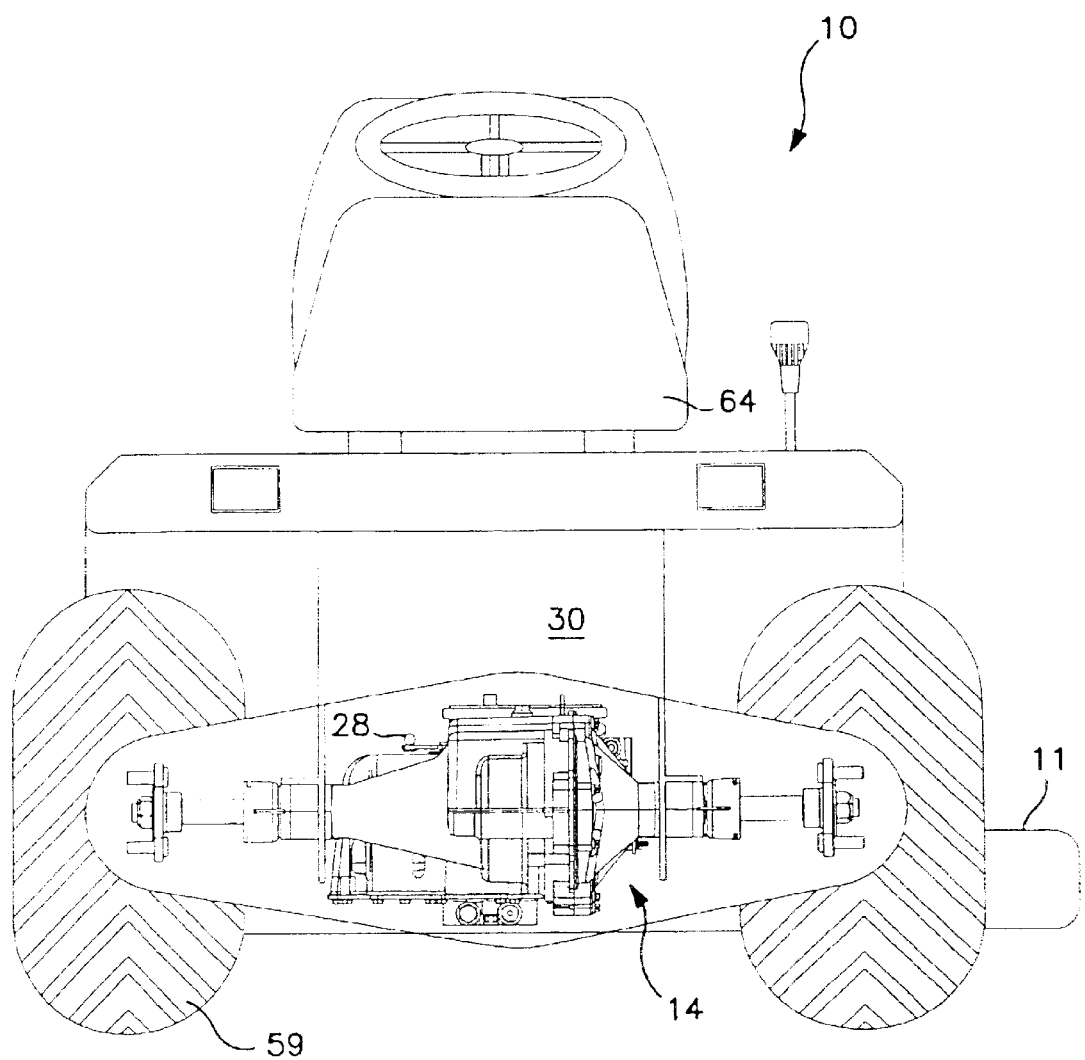
FIG. 6 shows a cutout view of FIG. 5 to more clearly show the transaxle.

FIG. 4 shows the same transaxle 14 as FIG. 3 but with the bypass 20 latched in the "on" position. Since the bypass is engaged, the vehicle may be rolled relatively easier even though there is no engine input. FIG. 5 shows a rear view of the vehicle 10 showing the hitch plate 30. The stamp out through which the bypass rod 28 extends is not visible behind the end of the bypass rod 28. FIG. 6 is a cutout of FIG. 5 to more clearly show the transaxle 14. The mower deck 11 is shown roughly aligned with the wheel axles. Note that the preferred stamp out in the present invention is circular. The present invention avoids the need for a keyhole stamp out and for a cross pin on the bypass rod 28 to secure the bypass actuator 20 in an engaged position.

FIG. 7 shows a top view of a transmission similar to the transaxle of FIG. 3 (with the axles removed), but with the bypass rod 28 extending in the opposite direction, i.e., it is rotated 180° in a plane normal to the axis 44 of the actuator 20. Accordingly, the bypass rod 28 would be pushed in toward the case 38 of transmission to activate the bypass actuator 20. Thus a rider could reach the rod 28 from the tractor seat 64 (See, e.g., FIG. 1A). While activation of the actuator 20 has been described in relation to pushing and pulling the bypass rod 28 relative to the casing 38, this is only for convenience. Other methods for manipulating the bypass arm 18 are within the spirit of the invention and will be understood by those of skill in the art. Furthermore, the latching assembly 48 may be readily adapted to operate with other chosen methods of bypass-arm manipulation so as to couple operation of the brake to the latch. The bypass arm 18 is in the disengaged or "off" position and the latch arm 40 is at an at-rest position against the brake arm 56 and directly against the spacer 60.

Figure 8:
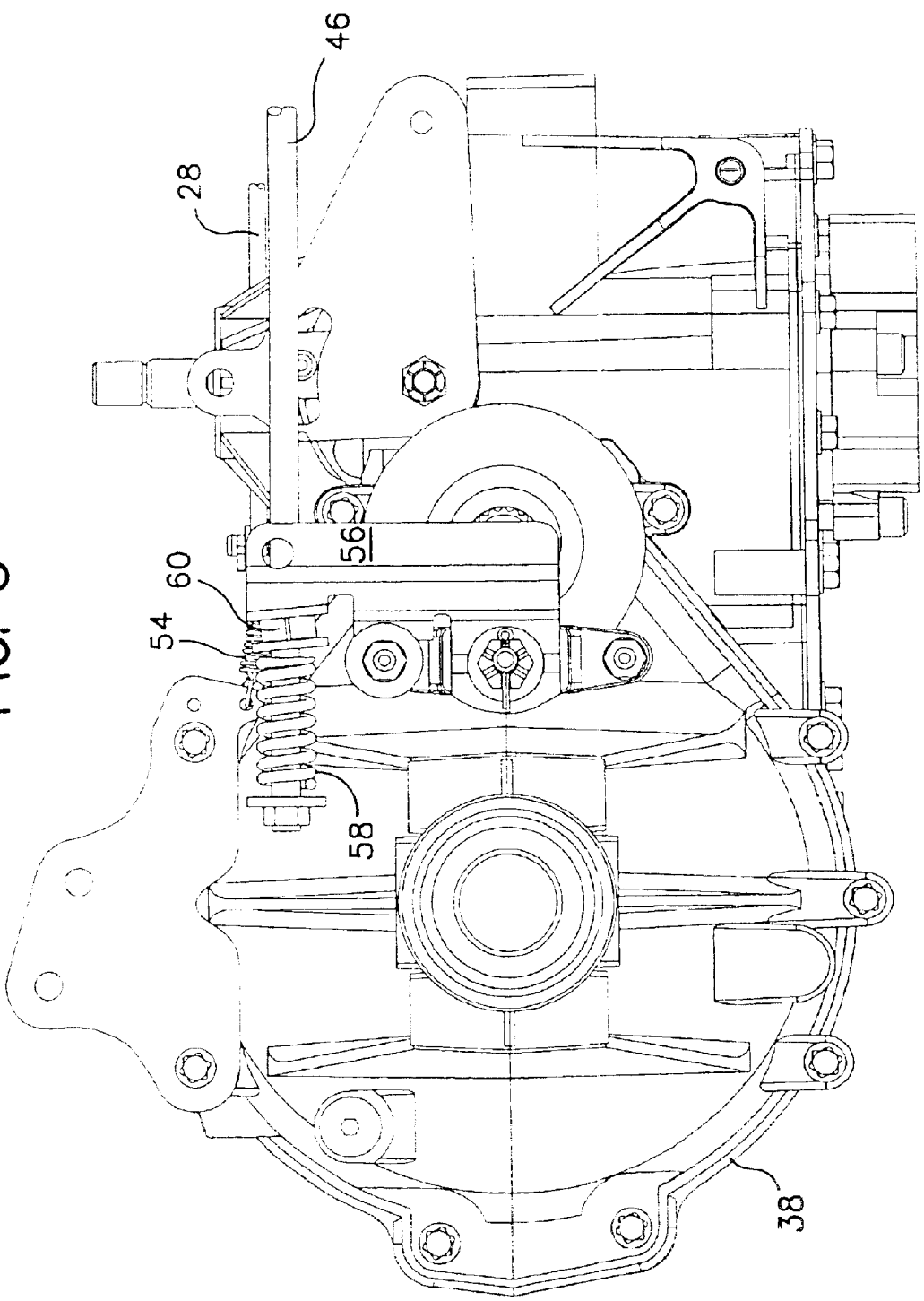
FIG. 8 is a side view of the transmission shown in FIG. 7 showing the bypass in the "off" position.

FIG. 8 is a side view of the transmission shown in FIG. 7; the bypass is in the "off" position. The compression spring 58 is not compressed and the brake arm 56 is not engaged.

Figure 9:
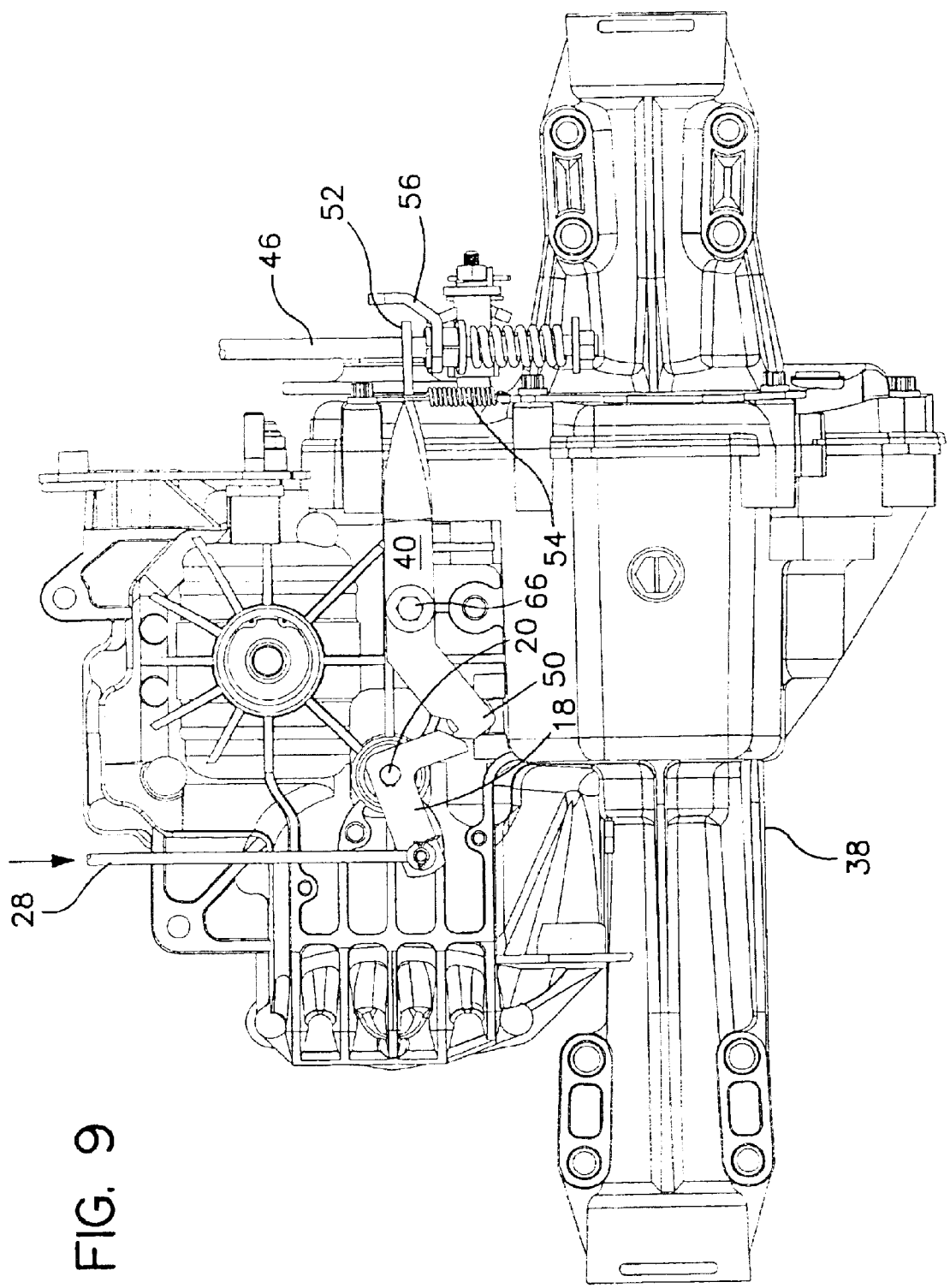
FIG. 9 is a top view of the transmission shown in FIG. 7 with the bypass rod is being pushed to activate the bypass actuator and the bypass arm is starting to engage the latch arm.

FIG. 9 is a top view of the transmission shown in FIG. 7. The bypass rod 28 is shown being pushed to activate the bypass actuator 20. The bypass arm 18 is starting to engage the latch arm 40. The extension spring 54 is being stretched and exerting a force on the latch arm 40 brake end 52 to bias the latch arm 40 toward the at-rest position. Spring 54 also forces the latching end 50 in the opposite direction as that of the brake end 52 since the latch arm 40 rotates about axis 42 (through bolt 66) which is positioned between the brake end 52 and the latching end 50.

Figure 10:
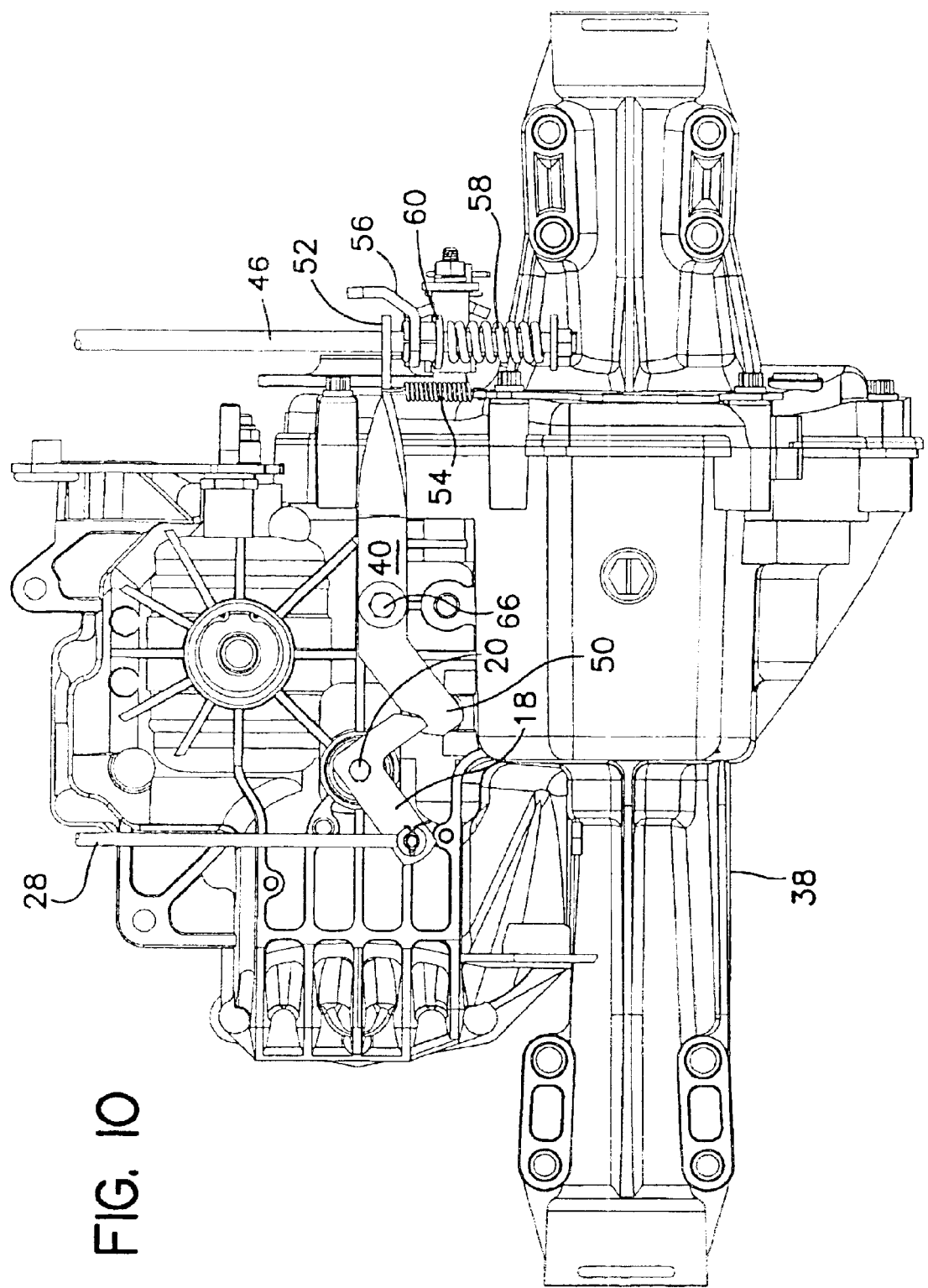
FIG. 10 shows a top view of the transmission shown in FIG. 9 with the bypass arm latched in the "on" position, thereby disengaging the transmission.

FIG. 10 shows the bypass arm 18 latched in the "on" position, thereby disengaging the transmission so the tractor rolls relatively more freely. The extension spring 54 exerts a force to maintain the latching end 50 of the latching arm 40 in engagement with the bypass arm 18. When the brake rod 46 is being actuated, the force transmitted to the latching arm 40 (via the compression spring 68) will overcome the force from the extension spring 54 and rotate the latch arm 40 out of engagement with the bypass arm 18. The springs in the hydraulic motor act to return the bypass actuator 20, and the bypass arm 18, to a disengaged position.

Figure 11:
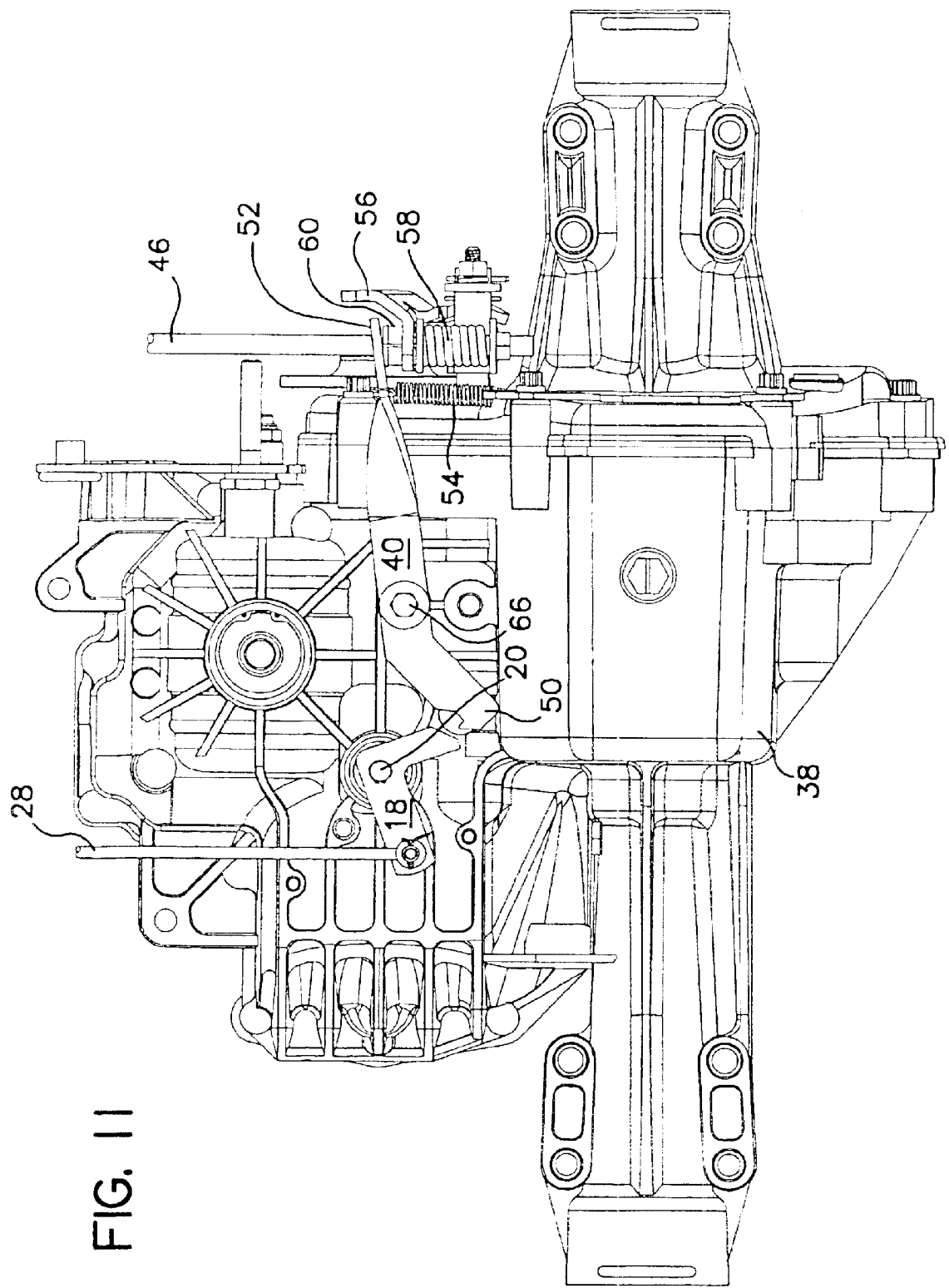
FIG. 11 shows a top view of the transmission of FIG. 7 with the bypass arm being unlatched.

FIG. 11 shows the bypass arm 18 being unlatched. The brake rod 46 is activated (via operator foot pedal typically) moving the compression spring 58 in contact with the bushing 60. As the brake rod 46 and compression spring 58 move further forward, the bushing 60 slides through the brake arm 66 and makes contact with the latch arm 40 at its brake end 52. As the bushing 60 (or spacer) applies a force to the latch arm 40, the latch arm 40 starts to disengage from the bypass arm 18. The brake arm 56 has not yet rotated, i.e., the compression spring 58 has not yet applied a force (or, a sufficient force) to the brake arm 56 when the latch arm 40 disengages the bypass arm 18. As the compression spring 68 on the brake rod 46 is further compressed (or pulled further forward by the brake rod 46), the brake arm 56 begins to be activated. Activating the brake arm 56 applies a braking force to the wheels 59 (or axles depending on the system). Thus, a system that utilizes dynamic braking (via the hydrostatic transmission) prior to conventional wheel/axle braking is achieved. By removing or otherwise adapting the bushing 60 or the latch arm 40 or both, the latch arm 40 can be made to disengage the bypass arm 18 contemporaneously with the onset of the brake arm 56 activation. The latching assembly can also be made to disengage the bypass arm 18 after activation of the brake arm 56 or, as previously discussed, before activation of the brake arm 56.

Figure 12:
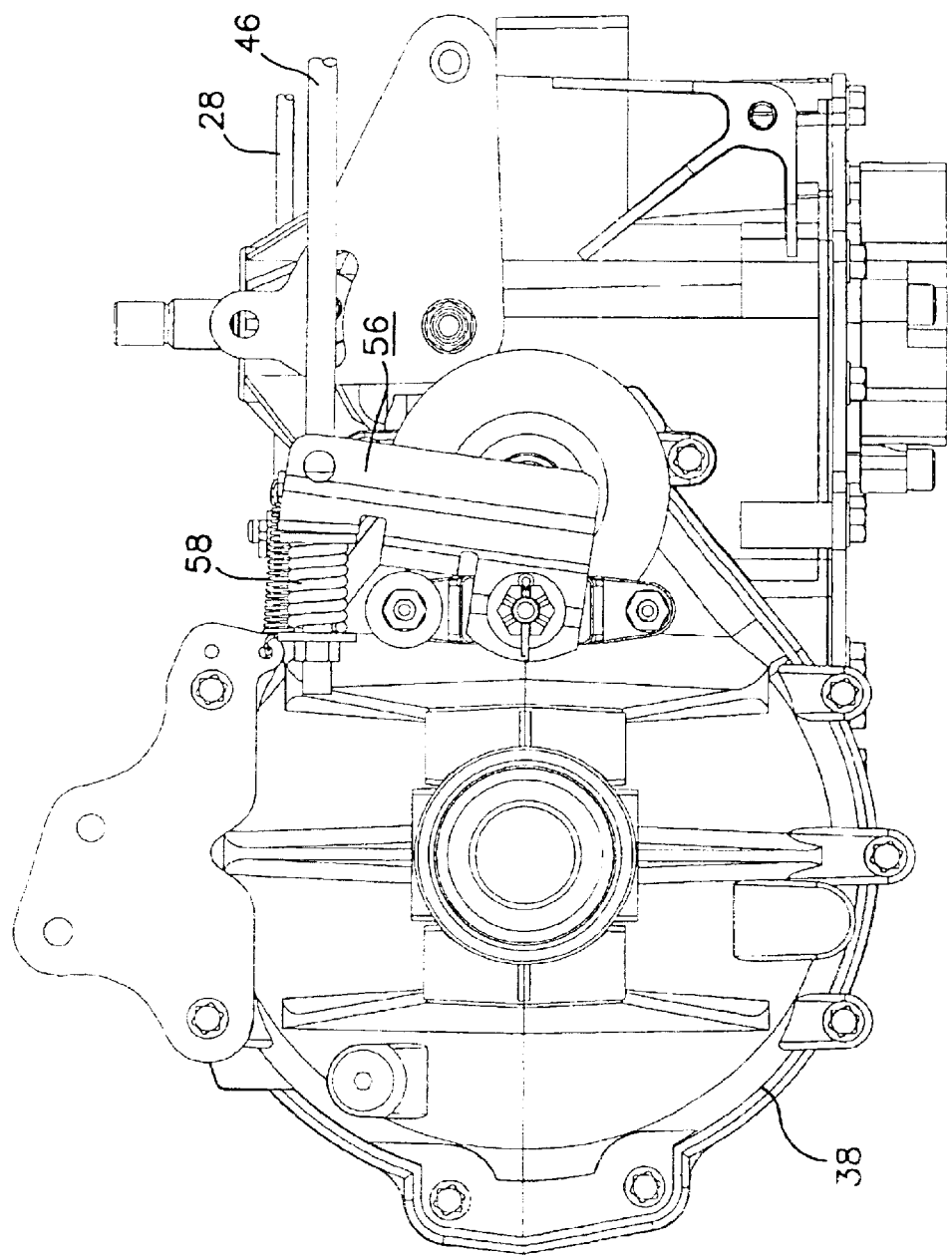
FIG. 12 is a side view of the transmission shown in FIG. 11 but with the bypass fully disengaged and the brake arm activated.

FIG. 12 is a side view of the transmission shown in FIG. 11 but with the bypass arm (not shown) fully disengaged, the compression spring 58 fully compressed and the brake arm 56 activated. By comparison, FIG. 8 is a similar view prior to the brake arm 56 being activated.

Figure 14:
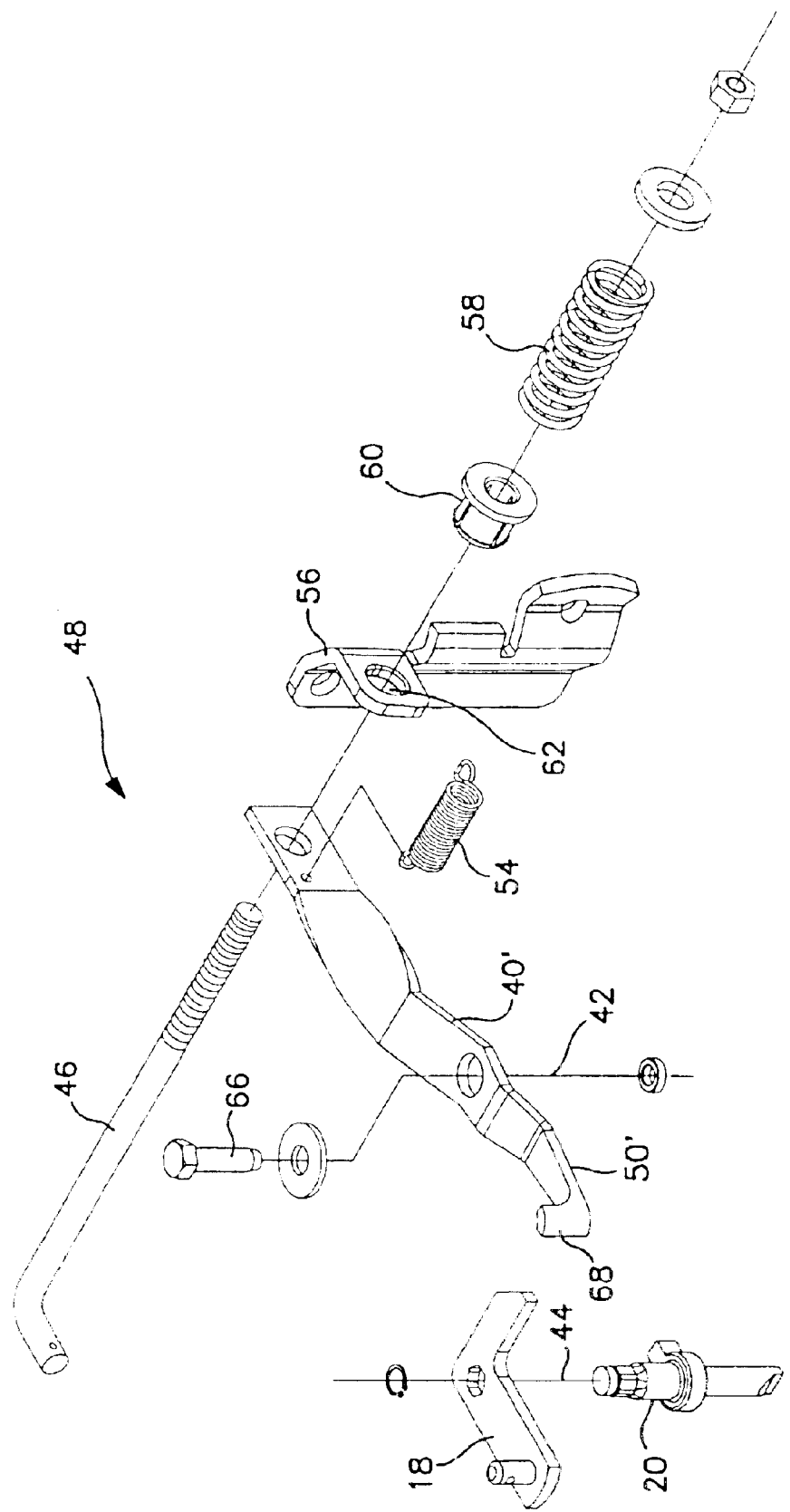
FIG. 14 is an isometric view of an alternative bypass latch using a different latch arm with a latching end having a tab generally perpendicular to the axis of the arm.

FIG. 13 is a view of a bypass latch assembly 48 according to an embodiment of the present invention showing the bypass mechanism 48 in the engaged position, so that rod 22 is rotated to force plate 26 towards the cylinder block of motor 29, thus lifting motor 29 off the motor running surface 51 of center section 53. FIG. 14 is an isometric view of a bypass assembly 48 with an alternative bypass latch arm 40' having a different latching end 50' from that shown in FIG. 13. The latching end 50' has a tab 68 extending generally perpendicular to the axis of the arm 40' (i.e., the tab 68 extends generally parallel to axis 42). The tab 68 need not extend perpendicular to the axis of the latch arm 40 but may be at a predetermined angle measured relative to the axis of the latch arm 40 or measured relative to an axis parallel to axis 42. The tab 68 allows the manufacturer to use looser manufacturing tolerances while achieving the desired latching capability. For example, the bypass arm 18 may be allowed out of plane movement, rather than being rigidly held to a motion in a common plane with the latching arm 40. Another alternative comprises adapting the latching end of the bypass arm 18 to latchingly engage the latching arm 40 even though both arms move out of plane.

While the invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification, including the drawings, as warranted.

What is claimed is:

1. An axle driving apparatus, comprising:
    a hydrostatic transmission, comprising a hydraulic pump connected to a hydraulic motor by a hydraulic circuit;
    a bypass actuator engaged to the hydrostatic transmission to permit hydraulic fluid to flow out of the hydraulic circuit;
    a bypass arm affixed to the bypass actuator and having an actuated position and a disengaged position; and
    a latching arm to engage the bypass arm when the bypass arm is rotated into the actuated position.

2. The axle driving apparatus of claim 1, wherein a spring is attached to the latching arm to bias the latching arm toward an at-rest position.

3. The axle driving apparatus of claim 1, further comprising a brake mechanism for actuating a brake arm, whereby the brake mechanism also interacts with the latching arm such that the latching arm is biased toward an at-rest position when the brake mechanism is actuated.

4. The axle driving apparatus of claim 3, wherein the biasing of the latching arm toward the at-rest position disengages the latching arm from the bypass arm, allowing the bypass arm to move from the actuated position.

5. The axle driving apparatus of claim 3, wherein the brake mechanism causes the latching arm to be biased toward the at-rest position prior to actuation of the brake arm.

6. The axle driving apparatus of claim 5, wherein the brake mechanism further comprises a brake rod and a member that slidably engages the brake arm and the brake rod, wherein the brake rod moves the member such that the member contacts the latching arm to bias the latching arm toward the at-rest position, and further movement of the brake rod causes the member to engage and move the brake arm.

7. The axle driving apparatus of claim 6, wherein the brake mechanism further comprises a spring mounted between an end of the brake rod and the member, such that the spring compresses with movement of the brake rod after the member has engaged the brake arm.

8. The axle driving apparatus of claim 1, wherein the latching end of the latch arm comprises a tab adapted to engage the bypass arm.

9. A method of maintaining a hydraulic bypass actuator in the actuated condition whereby hydraulic fluid is permitted to flow from a hydraulic circuit to a sump, the method comprising:
    moving a bypass arm to rotate a bypass actuator to the actuated position to thereby allow hydraulic fluid to flow from the hydraulic circuit; and
    during movement of the bypass arm, causing the bypass arm to engage a latching arm such that upon release of the bypass arm the bypass arm is maintained in the actuated position.

10. The method of claim 9, further comprising a method of returning the latching arm to an at-rest position where the latching arm is not engaged to the bypass arm, the return method comprising:
    actuating a brake mechanism; and
    during actuation of the brake mechanism, causing a portion of the brake mechanism to contact the latching arm and to thereby bias the latching arm toward the at-rest position.

11. The method of claim 10, wherein the brake mechanism comprises a brake arm, a slidable member positioned in an opening located in the brake arm, and a brake rod positioned within the slidable member, wherein movement of the brake rod causes the slidable member to move within the brake arm to cause the latching arm to be biased toward the at-rest position.

12. The method of claim 11, wherein further movement of the brake rod causes the slidable member to contact and move the brake arm.

13. The method of claim 11, wherein a spring is positioned on the brake rod between an end of the brake rod and the slidable member, such that movement of the brake rod causes the spring to contact and move the slidable member.

14. The method of claim 13, wherein movement of the brake rod after the slidable member contacts the latching arm causes the slidable member to contact and move the brake arm.

15. The method of claim 14, wherein additional movement of the brake rod is allowed after the brake arm rotates by compression of the spring.

* * * * *